United States Patent [19]

Yasuda et al.

[11] Patent Number: 5,357,381
[45] Date of Patent: Oct. 18, 1994

[54] FLEXIBLE MAGNETIC DISC DRIVE APPARATUS FOR DESIGNATING ALTERNATE SECTORS FOR DEFECTIVE SECTORS

[75] Inventors: Takehiko Yasuda, Shiwa; Yoshiya Kikuchi, Esashi, both of Japan

[73] Assignee: Matsushita Electric Industrial Co., Ltd., Osaka, Japan

[21] Appl. No.: 819,191

[22] Filed: Jan. 10, 1992

[30] Foreign Application Priority Data

Jan. 18, 1991 [JP] Japan .................. 3-004607

[51] Int. Cl.$^5$ ............................. G11B 5/09
[52] U.S. Cl. ................................. 360/53
[58] Field of Search ............ 360/48, 49, 53; 369/53, 369/54

[56] References Cited

U.S. PATENT DOCUMENTS

| | | | |
|---|---|---|---|
| 4,833,665 | 5/1989 | Tokumitsu et al. | 369/58 |
| 4,924,331 | 5/1990 | Robinson et al. | 360/49 |
| 4,984,230 | 1/1991 | Satoh et al. | 369/54 |
| 5,075,804 | 12/1991 | Deyring | 360/53 |

*Primary Examiner*—Donald Hajec
*Assistant Examiner*—Won Tae C. Kim
*Attorney, Agent, or Firm*—Stevens, Davis, Miller & Mosher

[57] ABSTRACT

A flexible magnetic disc drive apparatus is provided in which access efficiency to a flexible magnetic disc is improved, and which enables rewriting alternate information in the case of alternate registration and allows access even if there is a defect in an ID field. The flexible magnetic disc drive apparatus defines an alternate area for a defective sector assigned with a logical sector number separately from usual sectors provided outside a user area on a medium where normal access is performed, a system area for registering the alternate information and for other purposes, an area for writing the number of rewrite times of the plurality of system areas, and a storage section for storing alternate information read out of the system area, wherein it is made possible to apply a predetermined operation to the storage section where alternate information has been registered so as to be retrieved at a high speed when accessing the medium, and to recognize a correct alternate information among a plurality of informations even where a defect is generated in the system area on the medium.

40 Claims, 6 Drawing Sheets

INTERLEAVE: 3  SKEW: 2

| CYLINDER | SIDE | SECTOR NUMBER | | | | | | | | | | | | | | | |
|---|---|---|---|---|---|---|---|---|---|---|---|---|---|---|---|---|---|
| | | 1 | 2 | 3 | 4 | 5 | 6 | 7 | 8 | 9 | 10 | --- | 32 | 33 | 34 | 35 | 36 |
| DON'T CARE | DON'T CARE | *PHYSICAL POSITION* | | | | | | | | | | | | | | | |
| 0 | 0 | 1 | 13 | 25 | 2 | 14 | 26 | 3 | 15 | 27 | 4 | --- | 23 | 35 | 12 | 24 | 36 |
| 0 | 1 | 24 | 36 | 1 | 13 | 25 | 2 | 14 | 26 | 3 | 15 | --- | 34 | 11 | 23 | 35 | 12 |
| 1 | 0 | 35 | 12 | 24 | 36 | 1 | 13 | 25 | 2 | 14 | 26 | --- | 10 | 22 | 34 | 11 | 23 |
| 1 | 1 | 11 | 23 | 35 | 12 | 24 | 36 | 1 | 13 | 25 | 2 | --- | 21 | 33 | 10 | 22 | 34 |
| 2 | 0 | 22 | 34 | 11 | 23 | 35 | 12 | 24 | 36 | 1 | 13 | --- | 32 | 9 | 21 | 33 | 10 |
| 2 | 1 | 33 | 10 | 22 | 34 | 11 | 23 | 35 | 12 | 24 | 36 | --- | 8 | 20 | 32 | 9 | 21 |
| 3 | --- | | | | | | | | | | | | | | | | |

*ADDRESS INFORMATION ON MEDIUM*

FLEXIBLE MAGNETIC DISC DRIVE APPARATUS FOR DESIGNATING ALTERNATE SECTORS FOR DEFECTIVE SECTORS

FIELD OF THE INVENTION

The present invention relates to a flexible magnetic disc drive apparatus used in the of information industry field, more particularly, and to a flexible magnetic disc drive apparatus carrying alternate information for defective sectors.

BACKGROUND OF THE INVENTION

A conventional flexible magnetic disc unit is not provided with alternate processing of defective sectors, since the capacity of the medium itself is small and the medium can be exchanged for another. Instead, a defect mark is placed on a defective sector and that area is not used, thereby making it possible to avoid accessing the defective sector.

Furthermore, in a fixed magnetic disc drive apparatus, when a host unit designates an objective track number, the objective track is once accessed to read alternate information which has been written in an ID field of the objective sector. Thereby, alternate processing is performed either by accessing to a spare sector located in the same cylinder, after waiting for a rotation or by having a second access to an alternate area provided in a separate area.

In the above-described conventional flexible magnetic disc unit, however, an objective replaced sector is to accessed only after first accessing the defective sector to read its ID field and then accessing a spare sector in the same cylinder or an alternate area provided in a separate cylinder. This results in problems as follows.

When an alternate sector for a dective sector is designated, the alternate sector is accessed after accessing to the sector. Thus, two or more operation are required, thus the access efficiency to the magnetic disc drive apparatus is deteriorated.

When alternate information is required additionally in a medium which has been formatted once, it is normally required to rewrite alternate information in the ID field. Since it is impossible to know the position of the ID field accurately in a flexible magnetic disc unit in which a medium is to be changed without physical positional information (sector pulse) showing the ID field on the medium, it is impossible to rewrite ID information in flexible magnetic discs.

Moreover, when a defect is generated in the ID information loaded in a sector on the medium, it becomes impossible to load alternate information of the sector and to perform alternate processing.

SUMMARY OF THE INVENTION

It is an object of the present invention to solve such existing problems an to provide an excellent flexible magnetic disc drive apparatus in which access efficiency to the flexible magnetic disc is improved, and it is possible to rewrite alternate information for alternate registration, and to perform alternate processing even if a defect exists in an ID field.

In order to achieve the above-described object, according to the present invention, the flexible magnetic disc drive apparatus is provided with an alternate area for defective sectors outside of a normal area on the same medium assigned with logical sector numbers separately from normal sectors accepting normal accesses, a system area on the medium used for registering alternate information and for other purposes, an area for writing the number of rewrite times in a plurality of system areas, and a storage section for storing alternate information read out of the system area. In the apparatuses, a predetermined operation is applied to the storage section registered with alternate information so as to retrieve it at a high speed when the medium is accessed, and a correct information is made recognizable among a plurality of informations even when a defect is produced in the system areas on the medium.

The present invention performs the following operation with the composition as described above. Namely, when a defective sector is registered, a predetermined operation is applied to its designated sector number so as to obtain a logical sector number to be registered, this may include subtracting upper digits from the address of a defective sector to be alternated and calculating the address of the alternate sector relying on the remaining lower digits of the address. The designated sector number is written in the storage section corresponding to the position of the logical sector, and the contents thereof, together with the number of rewrite times to the system area, are written a plurality of times in the system area on the medium, to thereby complete registration of the defect. Then, when the alternate information is read out of the system area of the medium, all of the loaded alternate informations are read out and the numbers of rewrite times thereof are compared with one another, thus producing such effects that it can be known which information is the latest information and it can also be known if only one information is kept normal even when some of the informations are defective.

Practically, when access is made to a sector, it is possible to retrieve the storage section at a high speed by applying the same operation as that in registration to the scope where access is made, and to know the existence of alternating at the retrieval. Thus, there is such an effect that it is always possible to complete the access in one time even when alternate processing has been performed.

DESCRIPTION OF THE PREFERRED EMBODIMENTS

Figure 1:
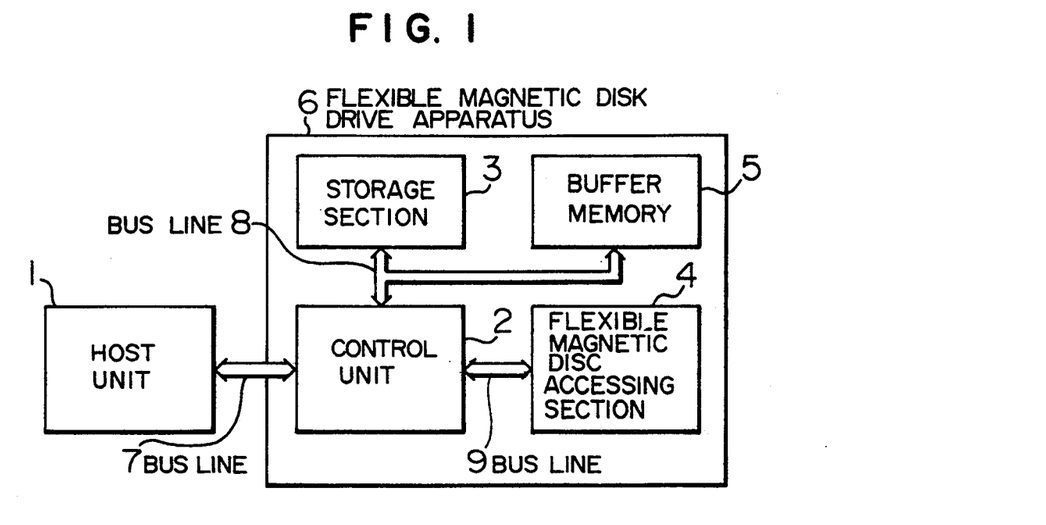
FIG. 1 is a schematic block diagram showing a state that a flexible magnetic disc drive apparatus in an embodiment of the present invention is connected with a host unit.

FIG. 1 is a schematic block diagram showing a flexible magnetic disc drive apparatus of an embodiment of the present invention connected with a host unit. In FIG. 1, a reference numeral 1 represents a host unit, and 6 represents a flexible magnetic disc drive apparatus. The flexible magnetic disc drive apparatus 6 is composed of a control unit 2 for controlling the whole unit based on instructions and data sent from the host unit 1, a storage section 3 for storing alternate origin information for alternate logical sectors #0 to #255 (FFh) in an alternate area, a flexible magnetic disc accessing section 4 having magnetic heads, signal modulator-demodulator circuits and the like and a buffer memory 5 for temporarily storing data which is sent from the host unit 1 and data which is read out of the flexible magnetic disc accessing section 4. The control unit 2 of the flexible magnetic disc drive apparatus 6 is connected with the host unit 1 through a bus line 7, is also connected with the storage section 3 and the buffer memory 5 through a bus line 8, and is further connected with the flexible magnetic disc accessing section 4 through a bus line 9.

Figure 2:
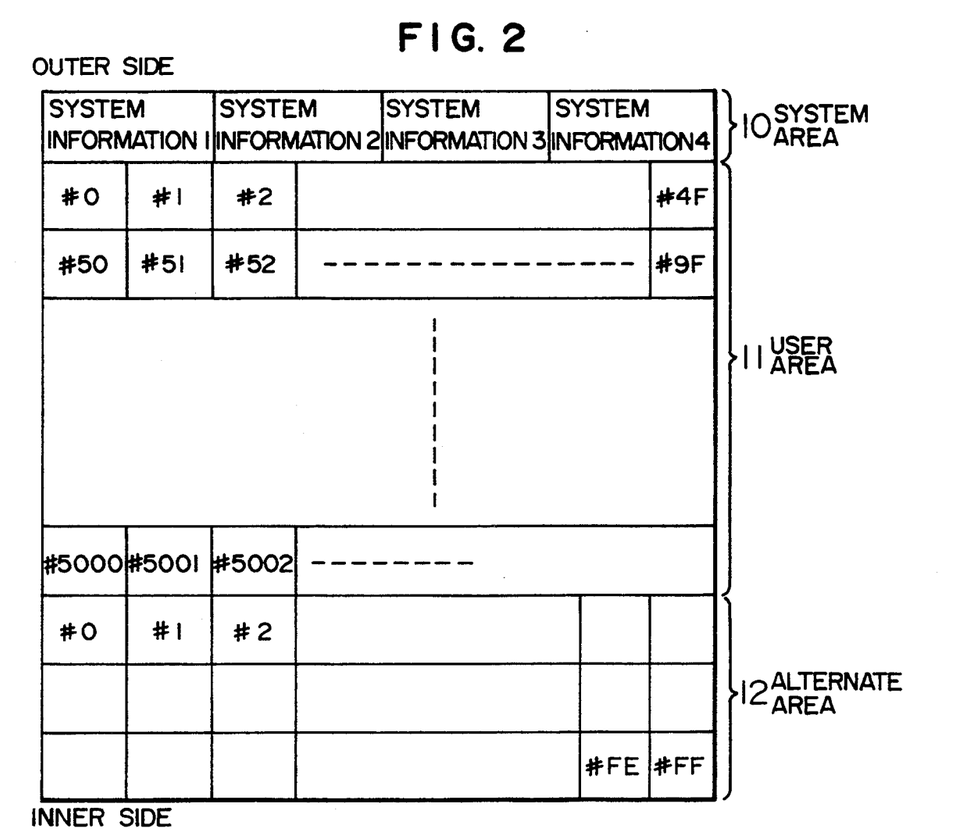
FIG. 2 is a format diagram in the flexible magnetic disc used in the unit.

FIG. 2 is a memory map diagram showing a construction of sectors on a medium. In FIG. 2, a reference numeral 10 represents a system area where alternate information and other information are loaded, which is composed of system informations 1 to 4, which each include the same contents for redundancy. Numeral 11 represents a user area including primary sectors, where the host unit 1 can read and write data freely. Numeral 12 represents an alternate area for alternating a primary sector which has become defective in the user area 11, which is composed of continuous logical sectors of alternate sectors #0 to #255 (FFh).

Figure 3:
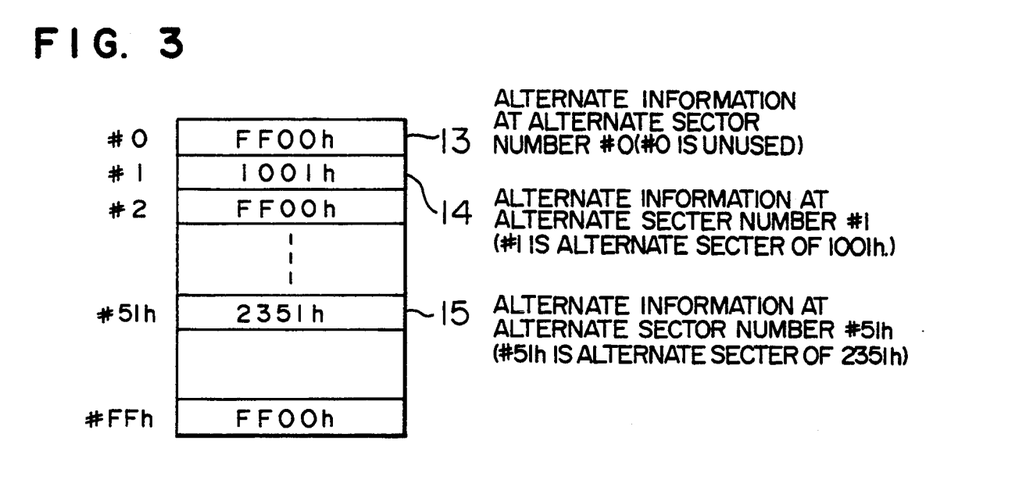
FIG. 3 is a typical diagram showing a structure of alternate information in the storage section of the unit.

FIG. 3 is a diagram showing an internal construction of the storage section 3 shown in FIG. 1. The storage section 3 is numbered #0 to #FFh with the same numbers as the alternate sectors in the alternate area 12 of the medium shown in FIG. 2. For example, 13 represents the alternate information of the alternate logical sector #0, and its stored data "FF00h" indicates that this alternate sector #0 has not been used. Numeral 14 represents the alternate information of the alternate logical sector #1, and data "1001h" indicates the alternate sector for a sector having the sector number 1001h. Numeral 15 represents the alternate information of the alternate logical sector #51h, and "#2351h" indicates the alternate sector alternating a sector numbered with 2351h. Alternate informations are loaded in #0 to #FFh of the storage section 3 in such a manner.

Figure 4:
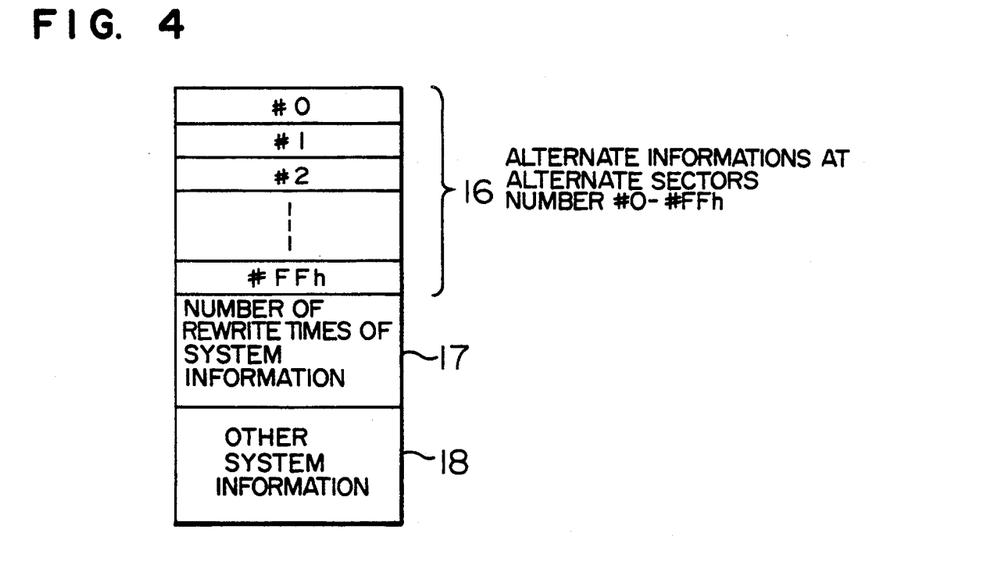
FIG. 4 is a typical diagram showing a structure of system information in the unit.

FIG. 4 is a diagram showing a construction of system information of the system area 10 shown in FIG. 2. In FIG. 4, alternate informations having alternate sector numbers #0 to #FFh to be loaded to the storage section 3 are loaded at 16, the number of rewrite times of system information is loaded at 17, and other system information are loaded at 18.

Figure 5:
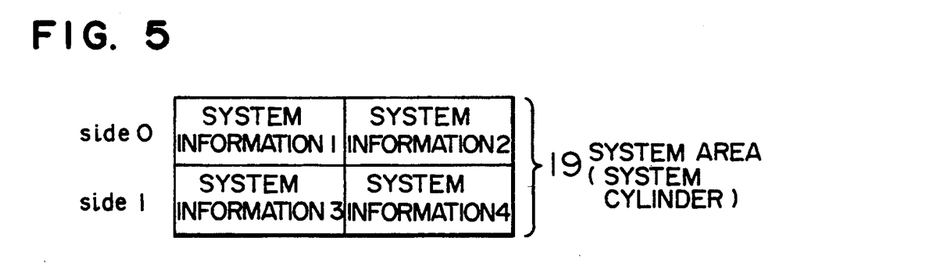
FIG. 5 is a typical diagram showing positions of system information in the system cylinder in the medium.

FIG. 5 is a diagram showing how to arrange system informations in a system area 19 of a system cylinder. System informations 1 and 2 are loaded in Side 0, and system informations 3 and 4 are loaded in Side 1, with the construction as shown in FIG. 4.

Next, the operation of the present embodiment thus constructed will be described. At the time of initialization of the flexible magnetic disc, initialization is performed to form the construction shown in FIG. 2 through the flexible magnetic disc accessing section 4 shown in FIG. 1. At this time, the sectors (primary sectors) of the user area 11 and the alternate area 12 are checked to determine whether data of the sectors are normal or defective by verification over the written data. Here, when a defect is discovered at the sector numbered with 2351h, for instance, the sector number 2351h is written in an address #51h as the alternate information 15 shown in FIG. 3. The address is obtained by applying the operation f(x)=(sector number) AND (00FFh). If the address #51h has already been used, the sector number is written in the address +#1, the processing being repeated until the storage section is used up entirely. However, the processing is returned to 00 after FFh. Then, after the inspection of the sectors is entirely completed, the system information obtained from the data loaded in the storage section 3 by adding the number of rewrite times=1 of the system information and other kind of system information as shown in FIG. 4, are written as duplicated system informations 1 to 4 in the system areas of Side 0 and Side 1, as shown in FIG. 5.

Figure 6:
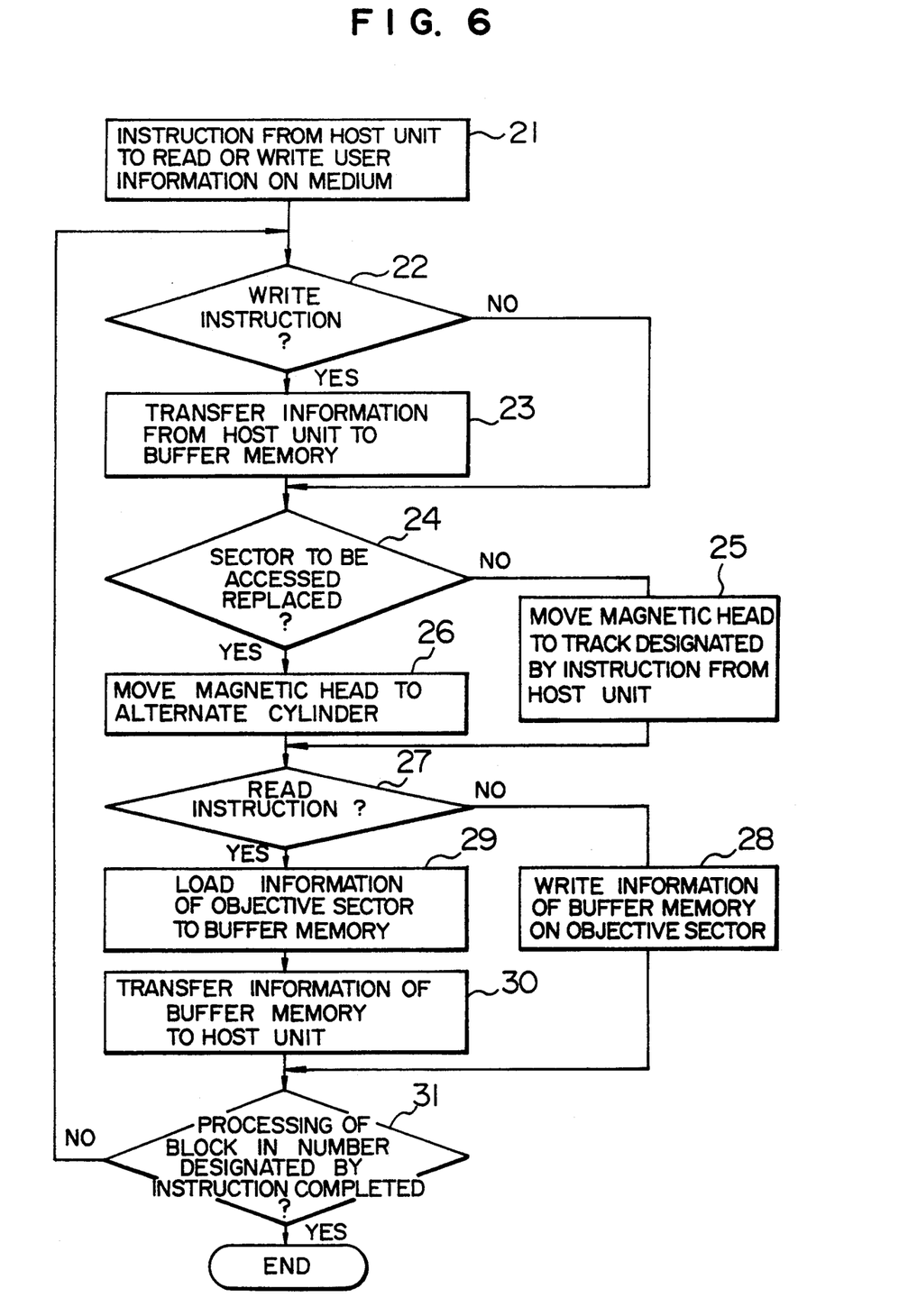
FIG. 6 is a flow chart showing read/write operation of information in the unit with respect to a host unit.

In FIG. 6, illustrating the flow chart of the read/write operation, when a read or write instruction to read or write the user information in the medium is given from the host unit 1 (step 21), the information from the host unit 1 is once transferred to and stored in the buffer memory 5 (step 23) in case it is a write instruction (step 22). Next, it is determined whether next sector to be accessed has been alternated or not (step 24), and the magnetic head is moved to a track designated by the instruction from the host unit 1 in case the sector has not been alternated (step 25). When the sector has been alternated, the magnetic head is moved to the alternate cylinder (step 26). Then, it is determined whether the instruction is a read instruction or not (step 27), and the information stored in the buffer memory 5 in the step 23 is written in the objective sector in case where the instruction is not a read instruction (step 28). When the instruction is a read instruction, the information of the objective sector is loaded in the buffer memory 5 (step 29), and the information is transferred to the host unit 1 in the next place (step 30). Then, it is determined whether processing has been completed by the number of blocks designated by the instruction from the host unit 1, and above-described steps are repeated in case processing has not been completed (step 31).

Figure 7:
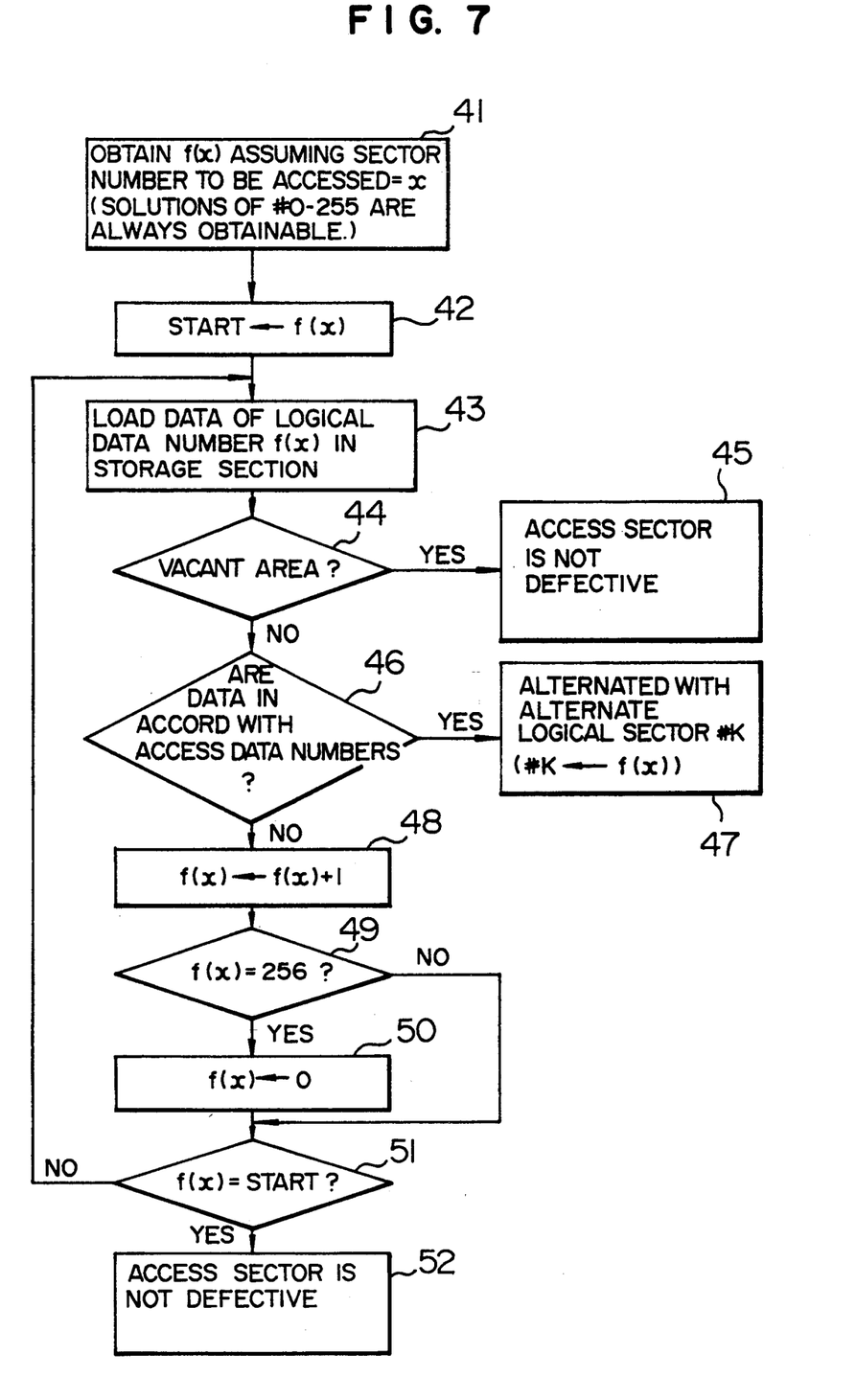
FIG. 7 is a flow chart showing internal processing of the unit for determining whether a sector has been applied with alternate processing or not when access is made to the sector designated by a host unit.

As described above, it is required to discriminate whether the sector to be accessed has been alternated and registered when accessing to the sector at time of read/write. The method thereof will be described with reference to FIG. 7. In case of read/write, the control unit 2 is able to know whether the sector designated by the host unit 1 has been registered in the storage section 3 or not by checking the address obtained by the same operation f(x) as the initialization. In FIG. 7, when f(x) is obtained assuming the number of the sector to be accessed=x, the solution is usually obtained between 00 and FFh (step 41). Here, when it is assumed that f(x)=0 is obtained, putting Start number=0 (step 42), the alternate information of the logical sector number=0 in the storage section 3 is read out (step 43). If the contents of the obtained address are "FF00h" as the alternate information 13 for the alternate sector #0 shown in FIG. 3, the alternate sector #0 is recognized as a vacant area and alternate registration has not been made (step 44). Therefore, the designated sector to be accessed is determined not to be a defective sector (step 45), and the designated sector is accessed as it is. Further, when the contents of the obtained address are for example, "1001h" as the alternate information 14 at #1 in FIG. 3, it is indicated that the designated sector has been processed to have the alternate sector #1 (step 47), if the value of "1001h" is compared with the sector number designated by the host unit 1 (step 46) and found to be in accord with each other. Thus, the access is made to the alternate sector #1 of the alternate area 12 shown in FIG. 2. Furthermore, if the sector number is not in accord with the above-mentioned value, the address of f(x) is added with 1 (step 48). If f(x)=256 (step 49), f(x)=0 is substituted (step 50). It is checked whether f(x)=Start has been reached during one round (step 51). In case of YES, it is determined that the designated sector to be accessed is not a defective sector (step 52), and the designated sector accessed as it is.

Figure 8:
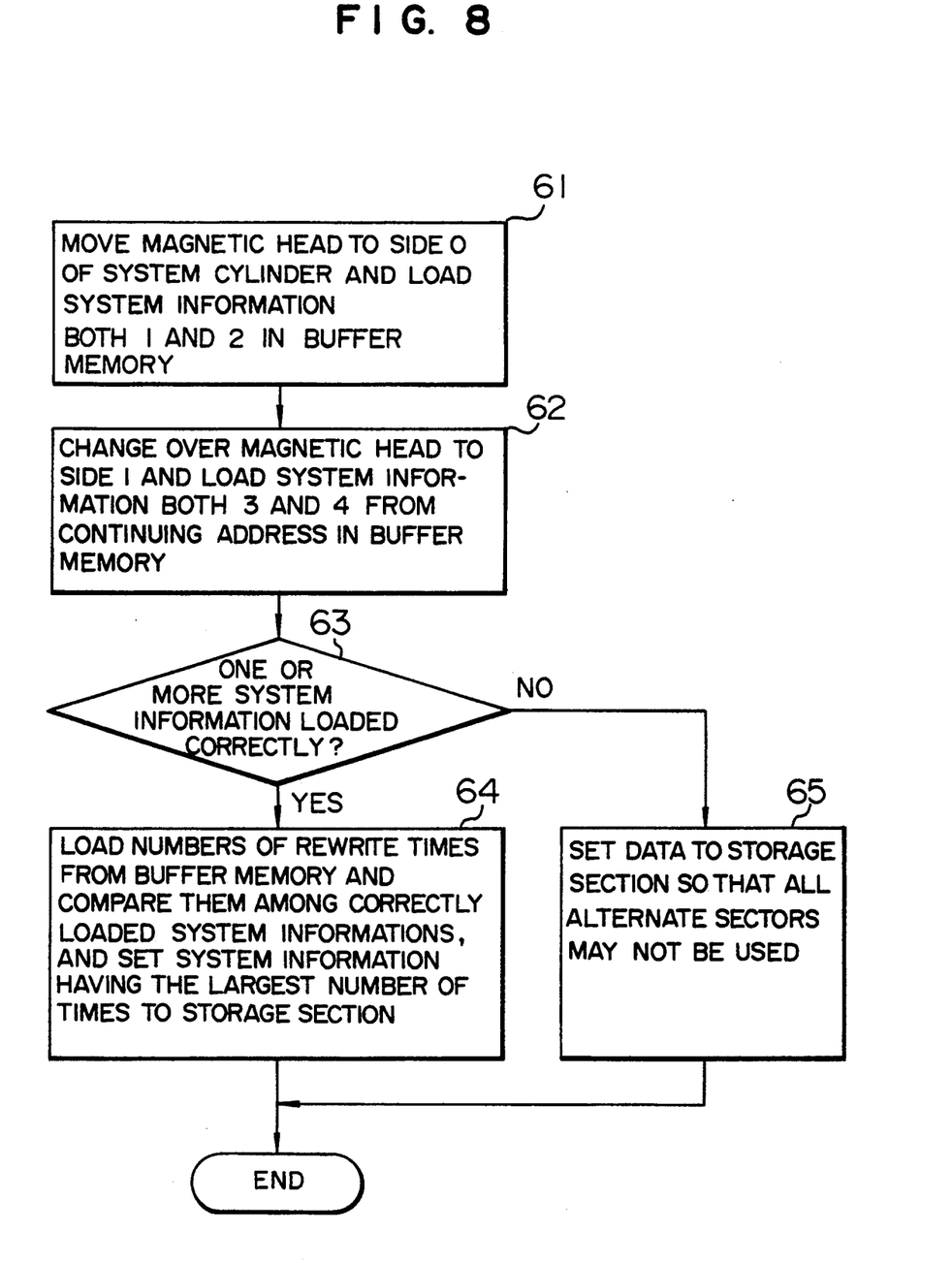
FIG. 8 is a flow chart showing internal processing for setting system information in the system area to a storage section in the unit when a medium is installed on the unit.

When a medium is installed on the unit, the system information is read out of the medium. The processing procedures at that time will be described with reference to FIG. 8. First, the magnetic head is moved to Side 0 of the system cylinder, and system informations both of 1 and 2, shown in FIG. 5, are loaded in the buffer memory 5 (step 61). Next, the magnetic head is changed over to Side 1, and system informations both of 3 and 4 are loaded starting from the succeeding address in the buffer memory 5 (step 62). It is determined whether the system informations have been loaded correctly or not in the above-described processing (step 63). In case the system informations have been loaded correctly, the number of rewrite times 17 of the system informations is loaded from the buffer memory 5 with respect to the correctly loaded informations among system informations 1 to 4, and the system information having the largest number of rewrite times is set to the storage section 3 (step 64). If none of the system informations could be loaded correctly, data is set in the storage section 3 so that all the alternate sectors may not be used (step 65).

Figure 9:
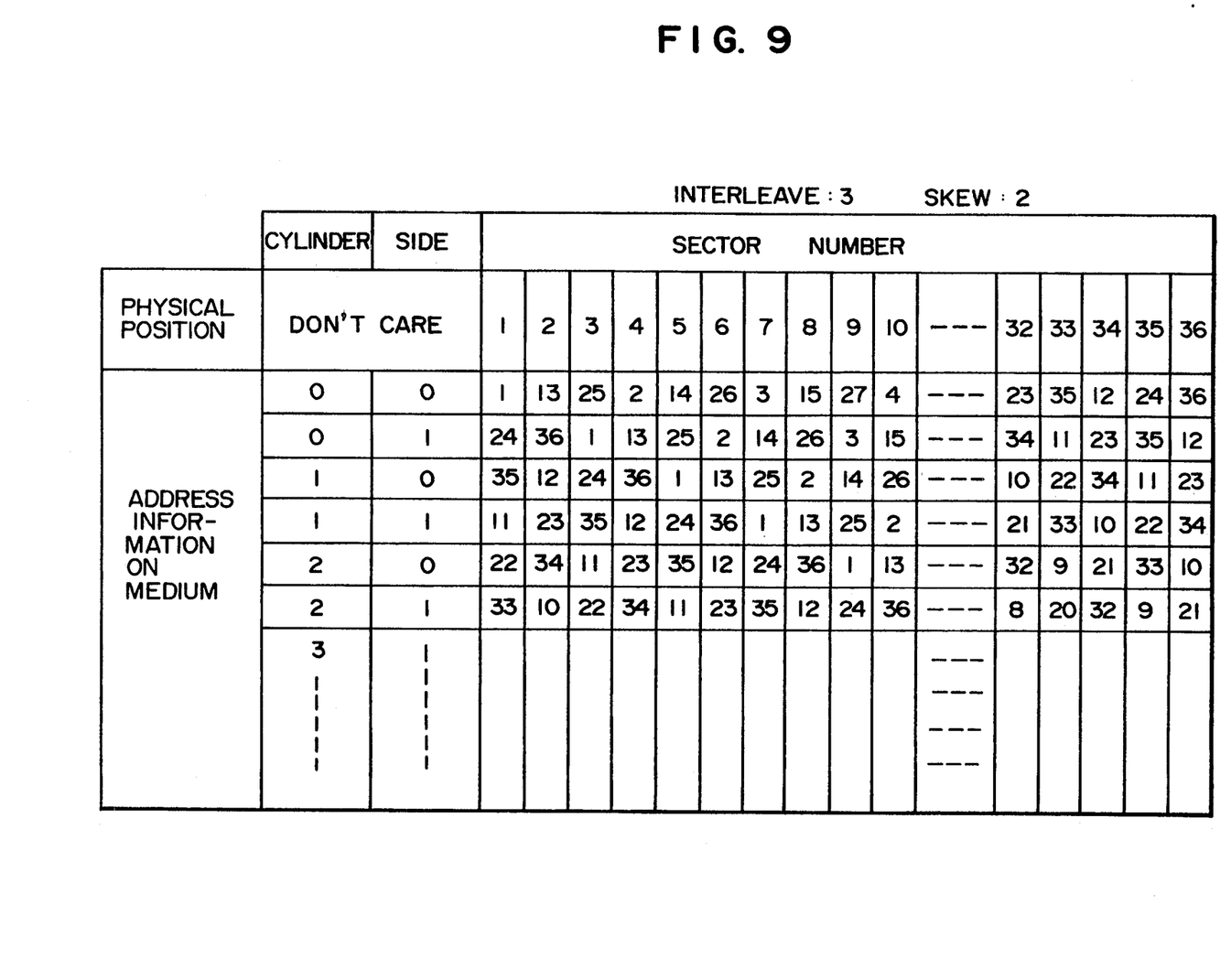
FIG. 9 is a format diagram when a physical position of a defective sector is specified in another embodiment of the present invention.

FIG. 9 illustrating another method for specifying physical positions, i.e., logical numbers of the alternate sectors, shows a format diagram when address information is written on a medium at a skew value=2 and an interleave value=3. Here, the physical position can be obtained since for example, the alternate logical sector number 8 at cylinder 0, Side 0 corresponds to the sector number 15 at cylinder 0, Side 0, assuming the number of sectors per track=36. In this example, the sectors designated by the host unit 1 for read or write of data are arranged discretely with respect to a specific alternate sector. Thus, it is possible to relocate the write position for an alternate sector to a remote position in case a burst error occurs in the data.

By storing medium information in every medium and loading medium information at need as described above, it is made possible to compute a physical position from the address on the medium, and to operates as if there were no apparent defects in the medium by utilizing the medium defect information, thus preventing recorded information from becoming unreadable and read-out of erroneous information from occurring.

According to the above-described embodiment, it is possible to process to alternate a defective sector at a time when a defect is produced on the medium, since the unit is provided with the system area 10 and the alternate area 12 as described above.

Further, the alternate destination is expressed by the address on the storage section 3 which corresponds one to one to the sector number of the alternate sector, thus making it possible to reduce the necessary capacity of the storage section 3 by half.

Further, it is possible to increase the retrieving speed of the alternate sector and to get through with the access to the medium always once by setting at f(x)=(sector number) AND (00FFh), assuming that the number of alternate sectors is $2^n$ pieces.

A system area recording the information on all the defective sectors and alternate sectors is provided outside the area on the medium where access is made in usual, and the information stored in the system area is loaded to the storage section 3 in the unit at the same time when the medium is installed on the unit so that only the storage section 3 may be referred for all the access to the medium thereafter. Thus, it is possible to perform alternate processing at a high speed.

Further, by loading four elements of system information to be loaded in the system area together with the number of rewrite times of the system informations, redundancy on the defect in the system area is improved, and it is possible to load the latest information among the four elements of system information.

Further, by setting the system information in the storage section 3 when the medium is installed on the unit, it is possible to access a medium in a similar manner to a conventional system where no alternate processing is performed, in case all the system informations could not be loaded.

Further, it is possible to perform alternate processing even if there is a defect in an ID field since no alternate information is loaded in the ID field, and it is further possible to register an additional defective sector at the occurrence after initialization since there is no need to rewrite information in the ID field for registration of the alternate information.

Further, as it only requires a simple logical product operation of f(x)=(sector number) AND (00FFh) in registering the alternate information, such effects are obtainable that the retrieving period of time is shortened, continuous defective sectors can be registered in continuous alternate sectors, and throughput can be improved when alternate processing is performed.

Besides, the system area 10 and the alternate area 12 are provided outside the user area 11 in the above-described embodiment, but similar effects are obtainable when these areas 10 and 12 are located within the user area 11. Further, similar operational effects to the case of the flexible magnetic disc drive apparatus are obtainable with respect to a fixed magnetic disc drive apparatus and also to magneto-optical disc drive apparatus and others, by considering the subject while replacing installation of the medium with starting the apparatus.

As it is apparent from above-described embodiments, the present invention has effects described hereunder.

It is possible to perform alternate processing on a defective sector when a defect is produced on a medium since the medium is provided with a system area and an alternate area.

Further, the alternate destination is expressed by the address on the storage section corresponding one to one to the sector number of the alternate sectors, thus making it possible to reduce the necessary capacity of the storage section by half.

Further, the retrieving speed of the alternate sector is greatly increased since a certain operation may be applied to the designated sector so as to obtain the physical position of the alternate sector assuming the number of the alternate sectors is $2^n$, and accessing to the medium is usually completed at one time since retrieving may be performed entirely within the storage section.

A system area for recording information on all of the defective sectors and the alternate sectors of the medium is provided outside the area on the medium where access is usual made, and these alternate informations are loaded from the system area to the storage section in the unit at once so that every access to the medium is made thereafter by referring to the storage section only. Thus, it is possible to perform alternate processing at a high speed.

Further, as the system area is loaded with a plurality of system informations to be loaded together with the number of rewrite times of the system informations, redundancy with respect to the defect in the system area is improved, and it is possible to always load the latest system information, even when a power source is temporarily disconnected or a defective area exists in the system area which cannot be loaded.

Further, as the unit is prepared to set the system information to the storage section when the medium is installed on the unit, it is possible to have an access as in a normal operation to such a medium where no alternate processing is performed, similarly to a case where all the system informations could not be loaded.

Further, since the alternate information has not been loaded in the ID field, alternate processing can be performed even if there is a defect in the ID field. Furthermore, since no rewriting of the ID field is performed in registration of the alternate information, it is possible to register a defective sector after initialization additionally.

Further, by applying a certain operation when the alternate information is registered, the retrieving period of time is shortened, and it is also possible to register continuous defective sectors in continuous alternate sectors and to improve throughput when alternate processing is performed.

We claim:

1. A disc drive system comprising:
(a) a disc-type recording medium which includes:
a user area, including primary sectors having logical sector numbers indicative of addresses thereof, for recording data information,
an alternate area, including a predetermined number of alternate sectors having serially numbered logical sector numbers, for being substituted for defective ones of said primary sectors, and
a system area, having a predetermined number of tables in which items are arranged corresponding to the alternate sectors, each of said items including defect information indicative of a defective primary sector associated with said selected one of said alternate sectors, and
(b) a disc drive apparatus comprising:
disc accessing means for detecting defective ones of said primary sectors and determining addresses of the detected defective sectors;
control means for calculating an address of an alternate sector corresponding to a detected defective sector in accordance with the address of the defective sector and a location in one of the tables corresponding to the address of the corresponding alternate sector; and
storage means for storing the defect information in the tables during initialization of the disc accessing means,
said disc accessing means including means for registering defect information including the address of the defective sector in the one of the tables of said system area in response to calculation of the address of the defective sector by the control means,
said control means including means for searching said corresponding location in one of the tables which includes information corresponding to the corresponding alternate sector stored in the storage means in accordance with an address of a primary sector to be accessed, and
the disc accessing means accessing (i) the primary sector when it is not defective and (ii) the corresponding alternate sector when the primary sector is defective.

2. A disc drive system according to claim 1, wherein the storage means includes storage portions corresponding in a one-to-one fashion to the logical sector numbers of the alternate sectors in the recording medium.

3. A disc drive system according to claim 1, wherein the predetermined number of alternate sectors is $2^n$, where n is a positive integer.

4. A disc drive system according to claim 1, wherein the recording medium comprises a flexible magnetic disc.

5. A disc drive system according to claim 2, wherein the recording medium comprises a flexible magnetic disc.

6. A disc drive system according to claim 3, wherein the recording medium comprises a flexible magnetic disc.

7. A disc drive system according to claim 1, wherein the predetermined number of alternate sectors is $2^n$, where n is a positive integer; and said control means comprises means for (i) calculating a corresponding table location by performing a logical AND operation between $2^n$ and the logical sector number of the detected defective primary sector, (ii) determining whether said corresponding table location is filled with information indicative of a different logical sector number of a different defective primary sector, and (iii) iteratively increasing said corresponding table location by one when it is determined that said corresponding table location is filled with said information indicative of said different logical sector number of said different defective primary sector, until a corresponding table location is determined which is not filled with information indicative of said different defective logical sector number of said different defective primary sector.

8. A disc drive system according to claim 1, wherein said tables further include rewrite information indicative of a number of times each individual table has been rewritten, said system further comprises buffer memory means, cooperating with said disc accessing means, for reading said rewrite information from said recording medium and storing said rewrite information; said control means cooperates with said buffer memory means to determine which of said tables has the greatest rewrite information and controls said storage means to store said table having the greatest rewrite information; and said disc accessing means updates said rewrite information in response to detecting a defective sector.

9. A disc drive system according to claim 1, wherein said control means comprises:
means for subtracting a predetermined number of upper digits from aid address of said detected defective sector, and
means for calculating said address of said corresponding alternate sector in accordance with remaining lower digits of said address of said detected defective sector.

10. A disc drive system according to claim 1, wherein the predetermined number of alternate sectors is $2^n$, where n is a positive integer; and said control means comprises means for (i) calculating said corresponding table location, (ii) determining whether said corresponding table location is vacant, and (iii) iteratively increasing said corresponding table location by one when it is determined that said corresponding table location is not vacant.

11. A disc drive system according to claim 1, wherein the recording medium comprises a fixed magnetic disc.

12. A disc drive system according to claim 2, wherein the recording medium comprises a fixed magnetic disc.

13. A disc drive system according to claim 3, wherein the recording medium comprises a fixed magnetic disc.

14. A disc drive system according to claim 4, wherein the recording medium comprises a fixed magnetic disc.

15. A disc drive system according to claim 5, wherein the recording medium comprises a fixed magnetic disc.

16. A disc drive system according to claim 6, wherein the recording medium comprises a fixed magnetic disc.

17. A disc drive system according to claim 7, wherein the recording medium comprises a fixed magnetic disc.

18. A disc drive system according to claim 8, wherein the recording medium comprises a fixed magnetic disc.

19. A disc drive system according to claim 9, wherein the recording medium comprises a fixed magnetic disc.

20. A disc drive system according to claim 10, wherein the recording medium comprises a fixed magnetic disc.

21. A disc drive system according to claim 1, wherein the recording medium comprises a magneto-optical disc.

22. A disc drive system according to claim 2, wherein the recording medium comprises a magneto-optical disc.

23. A disc drive system according to claim 3, wherein the recording medium comprises a magneto-optical disc.

24. A disc drive system according to claim 4, wherein the recording medium comprises a magneto-optical disc.

25. A disc drive system according to claim 5, wherein the recording medium comprises a magneto-optical disc.

26. A disc drive system according to claim 6, wherein the recording medium comprises a magneto-optical disc.

27. A disc drive system according to claim 7, wherein the recording medium comprises a magneto-optical disc.

28. A disc drive system according to claim 8, wherein the recording medium comprises a magneto-optical disc.

29. A disc drive system according to claim 9, wherein the recording medium comprises a magneto-optical disc.

30. A disc drive system according to claim 10, wherein the recording medium comprises a magneto-optical disc.

31. A disc drive system according to claim 7, wherein the recording medium comprises a flexible magnetic disc.

32. A disc drive system according to claim 8, wherein the recording medium comprises a flexible magnetic disc.

33. A disc drive system according to claim 9, wherein the recording medium comprises a flexible magnetic disc.

34. A disc drive system according to claim 10, wherein the recording medium comprises a flexible magnetic disc.

35. A disc drive apparatus using a disc-type recording medium which includes:
a user area, including primary sectors having logical sector numbers indicative of addresses thereof, for recording data information,
an alternate area, including a predetermined number of alternate sectors having serially numbered logical sector numbers, for being substituted for defective ones of said primary sectors, and
a system area, having a predetermined number of tables in which items are arranged corresponding to the alternate sectors, each of said items including defect information indicative of a selected one of said alternate sectors and an address of a defective primary sector associated with said selected one of said alternate sectors, said disc drive apparatus comprising:
disc accessing means for detecting defective ones of said primary sectors and determining addresses of the detected defective sectors;
control means for calculating an address of an alternate sector corresponding to a detected defective sector in accordance with the address of the defective sector and a location in one of the tables corresponding to the address of the corresponding alternate sector; and
storage means for storing the defect information in the tables during initialization of the disc accessing means,
said disc accessing means including means for registering defect information including the address of the defective sector in the one of the tables of said system area in response to calculation of the address of the defective sector by the control means,
said control means including means for searching said corresponding location in one of the tables which includes information corresponding to the corresponding alternate sector stored in the storage means in accordance with an address of a primary sector to be accessed, and
the disc accessing means accessing (i) the primary sector when it is not defective and (ii) the corresponding alternate sector when the primary sector is defective.

36. A disc drive system according to claim 35, wherein the storage means includes storage portions corresponding in a one-to-one fashion to the logical sector numbers of the alternate sectors in the recording medium.

37. A disc drive apparatus according to claim 35, wherein the predetermined number of alternate sectors is $2^n$, where n is a positive integer; and said control means comprises means for (i) calculating a corresponding table location by performing a logical AND operation between $2^n$ and the logical sector number of the detected defective primary sector, and (ii) determining whether said corresponding table location is filled with information indicative of a different logical sector number of a different defective primary sector, and (iii) iteratively increasing said corresponding table location by one when it is determined that said corresponding table location is filled with said information indicative of said different logical sector number of said different defective primary sector, until a corresponding table location is determined which is not filled with information indicative of said different logical sector number of said different defective primary sector.

38. A disc drive apparatus according to claim 35, wherein said tables further include rewrite information indicative of a number of times each individual table has been rewritten; said apparatus further comprises buffer memory means, cooperating with said disc accessing means, for reading said rewrite information from said recording medium and storing said rewrite information; wherein said control means cooperates with said buffer memory means to determine which of said tables has the greatest rewrite information and controls said storage means to store said table having the greatest rewrite information; and said disc accessing means updates said rewrite information in response to detecting a defective sector.

39. A disc drive apparatus according to claim 35, wherein said control means comprises:

means for subtracting a predetermined number of upper digits from said address of said detected defective sector, and means for calculating said address of said corresponding alternate sector in accordance with remaining lower digits of said address of aid detected defective sector.

40. A disc drive apparatus according to claim 35, wherein the predetermined number of alternate sectors is $2^n$, where n is a positive integer; and said control means comprises means for (i) calculating said corresponding table location, (ii) determining whether said corresponding table location s vacant, and (iii) iteratively increasing said corresponding table location by one when it is determined that said corresponding table location is not vacant.

* * * * *